United States Patent

Nelkin et al.

[15] 3,699,693
[45] Oct. 24, 1972

[54] APPARATUS FOR LAYING UNDERGROUND CABLE

[72] Inventors: Arthur Nelkin, Pittsburgh; Robert H. Whittaker, Export, both of Pa.

[73] Assignee: Westinghouse Electric Corporation, Pittsburgh, Pa.

[22] Filed: July 31, 1970

[21] Appl. No.: 59,881

[52] U.S. Cl. .................61/72.6, 37/193, 172/699, 172/700
[51] Int. Cl. ............F16l 1/00, E02f 5/02, A01h 3/64
[58] Field of Search............61/72.6, 72.1, 72.5, 72.7; 172/699, 700, 60; 37/193

[56] References Cited

UNITED STATES PATENTS 3,394,554  7/1968  Kinnan ......................61/72.6
3,332,249  7/1967  Idoine ........................61/72.6
1,987,268  1/1935  Roby ..........................37/193

FOREIGN PATENTS OR APPLICATIONS 619,220  1961  Italy..........................61/72.6
952,573  1956  Germany..................172/700

Primary Examiner—Jacob Shapiro
Attorney—F. H. Henson, C. F. Renz and M. P. Lynch

[57] ABSTRACT

The invention relates to a vibrating plow blade assembly employing laterally protruding auxiliary blades for cultivating soil beneath the ground surface to form an underground cable channel having non-parallel side walls which exert compacting forces on the cultivated soil about a buried cable in response to compaction activity. A thin coulter blade is used to neatly sever the ground surface to maintain surface disturbance at a minimum.

8 Claims, 6 Drawing Figures

PATENTED OCT 24 1972   3,699,693

WITNESSES
Theodore F. Wrobel
Leon M. Garman

INVENTORS
Arthur Nelkin and
Robert H. Whittaker
BY Michael P. Lynch
ATTORNEY

APPARATUS FOR LAYING UNDERGROUND CABLE

BACKGROUND OF THE INVENTION

State of the art cable laying techniques generally are not concerned with achieving optimum compaction of the soil around the buried cable. The most common method of laying underground cable involves cutting a cable channel having parallel side walls, burying a cable in the channel, and compacting the surface of the channel. The geometry of this channel does not support optimum soil compaction about the buried cable. In those instances where compaction is critical i.e., the laying of pressure sensitive intrusion detection cable, the technique generally employed involves the cutting of a relatively wide channel. While this geometry permits the application of suitable compaction pressure to the soil about the cable to achieve reasonable cable sensitivity to surface pressure, the badly scarred surface produced by the ditch drastically reduces the effectiveness of a supposedly concealed intrusion detection system.

SUMMARY

The invention relates to apparatus for burying underground cable including a plow blade assembly for cultivating the soil beneath the ground surface to produce a cable channel having non-parallel side walls which transmit surface compacting forces to the cultivated soil to provide uniform, solid compaction of the cultivated soil about the buried cable. A vibrating plow blade is employed which includes a coulter blade for neatly slicing the surface of the soil, laterally protruding wings or auxiliary blades function to produce the cable channel, and a compactor blade which responds to the vibrating action of the plow blade by compacting the soil immediately adjacent to the cable. A surface compacting device, such as a roller or vibrating compactor, is employed to complete the compaction of the loose soil in the cable channel.

The invention will become more readily apparent from the following exemplary description in connection with the accompanying drawing.

DESCRIPTION OF THE PREFERRED EMBODIMENT

Figure 1:
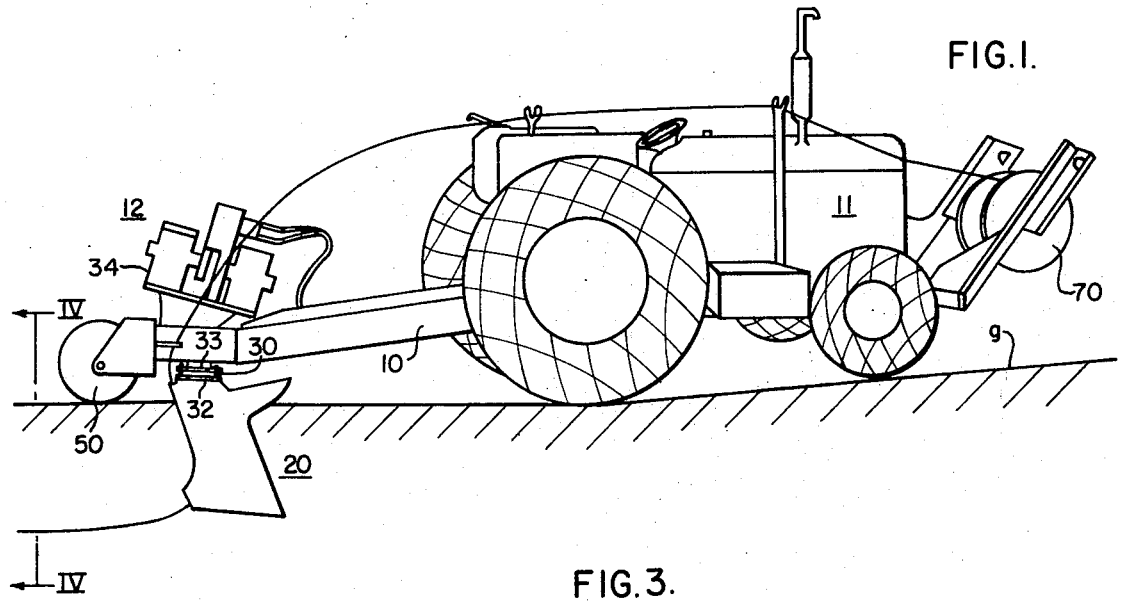
FIG. 1 is a side elevational view of a vehicle having a positionable arm and a cable plow assembly attached thereto.

Referring to FIG. 1 there is illustrated an apparatus embodying the invention which comprises a main support carrier boom 10 movably mounted upon and extending generally horizontally from a surface vehicle such as tractor 11. The boom 10 may, for example, be pivotally connected to a part of the frame of the tractor 11 such that a hydraulic system 12 may operate to vertically position the boom and the cable plow assembly 20 attached thereto above or below the surface g upon which the tractor 11 runs.

Although not shown the hydraulic system 12 includes the normal circuitry for the selective operation of its components.

Attachment of the cable plow assembly 20 to the boom 10 is provided by bolts 30 which extend through a plate 32 of a vibrator platform structure. Spaced above plate 32 is a vibrator platform 33 on which a commercially available vibratory unit, or vibrator 34, is secured. The vibrator 34 is preferably of the hydraulic driven type although other types would be satisfactory.

The apparatus described thus far represents typical commercial equipment of which the Sabre Plow Model P-30 of Parsons Company, Division of Koehring Company is one example.

Figure 2:
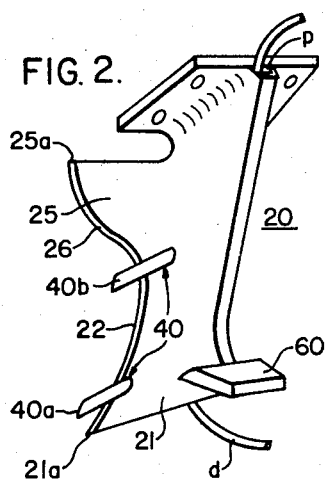
FIG. 2 is a perspective view of a cable plow embodying the invention.
Figure 3:
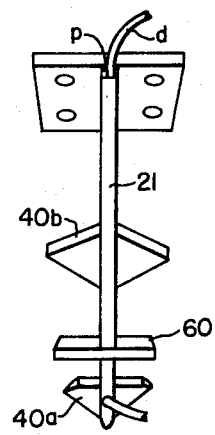
FIG. 3 is an end elevation view of the right or rear portion of the cable plow of FIG. 2.

The cable plow blade assembly 20 as illustrated in FIGS. 1, 2 and 3 comprises a plow blade 21 which has a cutting edge 22 for earth separating purposes and terminates at its bottom end in a downward and forward direction at point 21a. The angular disposition of the leading edge of the plow blade 21 relative to the surface g concentrates the forward plowing action at the point 21a which increases the plow blades capability to shatter rocks, branches, etc. Furthermore, the angular disposition of the plow blade 21 in conjunction with the vibratory action imparted by the vibratory unit 34 enables the blade 21 to clear the path of the plow blade by kicking obstacles such as buried rocks and branches to the surface g. The angle of the plow blade 21 relative to the surface is determined in part by the vibratory action imparted to the plow blade 21, i.e., vertical or horizontal vibration.

An integral part of the plow blade assembly is a thin coulter blade 25 having a cutting edge 26 which extends upward and forward and terminates at a point 25a. The coulter blade 25 responds to the vibrating action imparted to the plow blade assembly 20 by the vibratory unit 34 by neatly cutting the surface g in the path of travel of the plow blade assembly 20. The neat severing action of the surface g by the coulter blade 25 avoids the extreme disruption of the surface g that would result if the vibratory action of the heavier plow blade 21 was utilized to sever the surface g. This consideration is of extreme importance in the application of the cable plow assembly 20 to the laying of intrusion detection cable which must be buried inconspicuously in order to be effective.

An essential requirement in the installation of pressure sensitive intrusion detection cable is solid, uniform compaction of the soil in the cable channel to provide optimum sensitivity of the cable to surface disturbances resulting from the presence of personnel, vehicles, etc. The cross-sectional geometry of the cable channel is altered by use of auxiliary blades 40 protruding laterally from the plow blade 21. It was determined experimentally that through selective positioning of the auxiliary blade 40 at various angles to the path of plow travel that the cross-sectional geometry of the channel could be altered.

It was concluded that cable channel geometries in which the side walls of the channel were non-parallel provided for more dense compactions of the cultivated soil about the buried cable which resulted in increased cable pressure sensitivity. Two particularly desirable cable channel geometries are illustrated in FIGS. 4 and 5.

Figure 4:
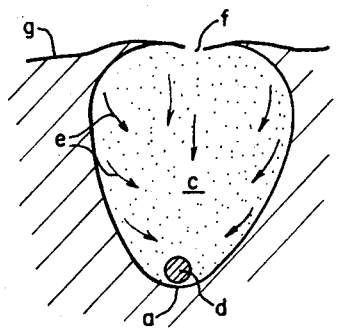
FIG. 4 is a fragmentary sectional view taken along the line IV—IV of FIG. 1.
Figure 5:
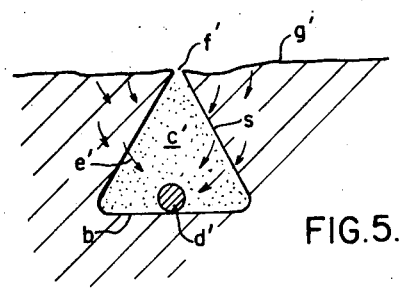
FIG. 5 is a sectional view of an alternate cable channel.

The auxiliary blade arrangement illustrated in FIGS. 2 and 3 involving a set of auxiliary blades 40a positioned close to the bottom of the plow blade 21 and a larger set of auxiliary blades 40b positioned from the ground surface g about one-third of the total depth of the cable channel produces a substantially heart-shaped cross-sectional channel c of cultivated soil as illustrated in FIG. 4 in response to the vibratory motion of the plow blade 21. The heart-shaped geometry of the channel c, and particularly the side walls which converge to form the trough portion a of the channel c which corresponds to the position of the cable d, tends to funnel or force the movement of soil in a pattern represented by the arrows e in response to the surface compaction such as that imparted by the trailing roller 50. The roller 50 in addition to producing soil compaction, operates to close the furrow f developed by the cutting action of the coulter blade 25.

In addition to the compaction provided by the roller 50, a compactor blade 60 extends rearwardly from the bottom rear portion of the plow blade 21 and travels directly above the cable d which is fed through a passage p in the rear portion of the plow blade 21 and out of the bottom of the blade 21 into the channel c. The positioning of the cable d against the uncultivated soil provides a solid base against which the cable can rest. The vibratory motion of the cable blade assembly 20 effects at the desired depth compacting of the soil in the immediate vicinity of the cable c by the action of the compactor blade 60 which supplements the soil compaction provided by the roller 50.

The angle at which the auxiliary blades 40a and 40b are affixed to the plow blade 21 is a function of the angle of vibration relative to the path of travel of the plow blade assembly 20. A vertical vibrating plow motion necessitates an auxiliary blade angle approaching the horizontal plane, whereas a horizontal vibrating plow motion requires an auxiliary blade angle approaching the vertical plane.

The number and size of the auxiliary blades utilized as well as the size of the compactor blade is a function of the depth at which the cable is to be laid and to some extent a function of the type of soil involved.

In operation the plow blade assembly is operatively disposed to a specified depth within a previously dug hole. The end of the cable is staked or otherwise secured within the hole for retention prior to the advancement of the plow. The cable extends upwardly through the bottom of the plow blade 21 and is fed from a cable reel 70 which may be carried by the vehicle 11, as shown, or by another vehicle.

As the cable plow assembly is pulled through the soil, the cable d is paid-out from the reel 70, through the passage p in the plow blade 21 and into the bottom of the cable channel c.

The cross sectional geometry of the cable channel c' illustrated in FIG. 5 is essentially triangular having side walls s diverging from an apex corresponding to the furrow f' and terminating at the base b. This cable channel geometry is produced by positioning a single set of auxiliary blades near the bottom of the plow blades. Compaction pressure applied to the ground surface g' at the furrow f' is transmitted by the side walls s, as illustrated by the arrows e', to the cultivated soil in the cable channel c' resulting in uniform compaction of the soil against the cable d'.

Figure 6:
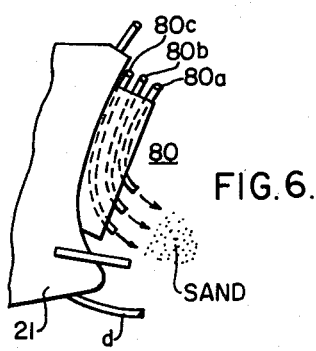
FIG. 6 is a fragmentary side elevational view of the rear portion of a modified form of the cable plow assembly of FIGS. 1, 2 and 3.

Referring to FIG. 6 there is illustrated a modification to the cable plow assembly 20 which comprises the addition of a sand ejector assembly 80 affixed to the back of the plow blade 21. The controlled supply of sand through the tubular passages 80a, 80b and 80c enhances the compaction operation in adverse soil conditions by improving the flow of soil about the cable.

While a single boom and cable plow assembly has been described, it is to be understood that additional boom-cable plow assemblies could be attached to a single vehicle to permit the simultaneous laying of more than one cable. Furthermore the apparatus described is applicable to the laying of pipelines and similar articles requiring secure positioning underground.

We claim:

1. Apparatus for laying cable in the ground at a distance below the surface of the ground, comprising in combination, a cable plow assembly disposed beneath the surface of the ground, means operatively connected to said cable plow assembly for advancing said cable plow assembly, means associated with said cable plow assembly for imparting vibrator motion thereto, said cable plow assembly including, coulter blade means for severing the surface without significantly disrupting the surface of the ground, a plow blade means including a forward cutting member and laterally protruding auxiliary blades, said auxiliary blades positioned so as to cultivate the soil to produce a channel below the surface of the ground, wherein said auxiliary blades comprise, a first pair of auxiliary blades positioned near the bottom of said plow blade means, and extending laterally from either side of said plow blade means, and a second pair of larger auxiliary blades positioned some distance above said first pair of auxiliary blades and extending laterally from either side of said plow blade, said first and second pairs of auxiliary blades being angularly disposed so as to cultivate the soil in such a manner as to produce a channel which is substantially heart-shaped in cross section, means for introducing cable into said channel, and means for applying soil compacting forces to the ground surface above said channel, said side walls of said channel transmitting said compacting forces to the cultivated soil to enhance compaction of the cultivated soil about the cable.

2. Apparatus for laying cable in the ground at a distance below the surface of the ground, comprising in combination, a cable plow assembly disposed beneath the surface of the ground, means operatively connected to said cable plow assembly for advancing said cable plow assembly, means associated with said cable plow assembly for imparting vibratory motion thereto, said cable plow assembly including, coulter blade means for severing the surface without significantly disrupting the surface of the ground, a plow blade means including a forward cutting member and laterally protruding auxiliary blades, said auxiliary blades positioned so as to cultivate the soil to produce a channel below the surface of the ground, the sides of said channel being substantially non-parallel, means for introducing cable into said channel, a compactor blade attached to said plow blade means and extending rearwardly from the rear, bottom portion of said plow blade means, said compactor blade riding in the channel above said cable to compact the cultivated soil about the cable in response to the vibratory motion of said cable plow assembly, and means for applying soil compacting forces to the ground surface above said channel, said side walls of said channel transmitting said compacting forces to the cultivated soil to enhance compaction of the cultivated soil about the cable.

3. Apparatus as claimed in claim 2 wherein said forward cutting member of said plow blade slopes downwardly and forwardly to facilitate the penetration of the soil and to clear the path of the cable plow assembly by forcing obstacles such as rocks and branches to the surface in response to the vibratory motion of said cable plow assembly.

4. Apparatus as claimed in claim 2 including a sand ejector assembly for supplying sand into the channel to enhance the compaction of the soil about the cable.

5. A method for laying underground cable utilizing a plow blade assembly positioned beneath the surface of the ground, including the steps of, severing the surface of the ground without significantly disrupting the surface, cultivating the soil beneath the surface of the ground in response to vibratory motion of the plow blade assembly to produce a cable channel having side walls of undisturbed soil extending intermediate said ground surface and the cultivated soil and forming a cable channel which is substantially symmetrical for transmitting surface applied compacting forces to the cultivated soil to enhance compaction of the cultivated soil about the cable, feeding cable into said cable channel, and applying compacting forces to the surface of the ground above said channel.

6. A method as claimed in claim 5 including the step of feeding sand into said cable channel to improve compaction of the cultivated soil about said cable.

7. Apparatus as claimed in claim 2 wherein said means for introducing cable into said channel comprises a cable feeding means associated with said plow blade means for feeding cable through the bottom of said plow blade means into said channel.

8. Apparatus for laying cable in the ground at a distance below the surface of the ground, comprising in combination, a cable plow assembly disposed beneath the surface of the ground, means operatively connected to said cable plow assembly for advancing said cable plow assembly, means associated with said cable plow assembly for imparting vibratory motion thereto, said cable plow assembly including, coulter blade means for severing the surface without significantly disrupting the surface of the ground, a plow blade means including a forward cutting member and laterally protruding auxiliary blades, said auxiliary blades positioned so as to cultivate the soil to produce a channel below the surface of the ground, wherein said auxiliary blades comprise, a first pair of auxiliary blades positioned near the bottom of said plow blade means and extending laterally from either side of said plow blade means, and a second pair of smaller auxiliary blades positioned some distance above said first pair of auxiliary blades and extending laterally from either side of said plow blade, said first and second pairs of auxiliary blades being angularly disposed so as to cultivate the soil in such a manner as to produce a channel which is substantially larger at the bottom than at the top, means for introducing cable into said channel, and means for applying soil compacting forces to the ground surface above said channel, said side walls of said channel transmitting said compacting forces to the cultivated soil to enhance compaction of the cultivated soil about the cable.

* * * * *